(12) United States Patent
Smith et al.

(10) Patent No.: US 8,155,575 B2
(45) Date of Patent: Apr. 10, 2012

(54) SYSTEMS AND METHODS FOR ORIENTING MEDIA FOR IMPROVED SCAN QUALITY

(75) Inventors: Ryan M. Smith, San Diego, CA (US); Kevin Bokelman, San Diego, CA (US); Michael Janczyk, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 742 days.

(21) Appl. No.: 12/257,564

(22) Filed: Oct. 24, 2008

(65) Prior Publication Data

US 2009/0283964 A1 Nov. 19, 2009

Related U.S. Application Data

(60) Provisional application No. 61/054,017, filed on May 16, 2008.

(51) Int. Cl.
*G03G 15/00* (2006.01)
(52) U.S. Cl. ...................................................... 399/378
(58) Field of Classification Search .................. 399/378, 399/377; 358/487, 506, 474, 494, 509, 475; 250/221, 559.4, 599.44, 559.37
See application file for complete search history.

(56) References Cited

U.S. PATENT DOCUMENTS

| | | | |
|---|---|---|---|
| 5,301,034 A | 4/1994 | Jacob | |
| 5,305,397 A | 4/1994 | Yamaguchi et al. | |
| 5,574,578 A * | 11/1996 | Dresch et al. | 358/490 |
| 5,905,580 A | 5/1999 | Cok et al. | |
| 6,157,440 A * | 12/2000 | Ikeda | 355/75 |
| 6,408,084 B1 | 6/2002 | Foley | |
| 6,519,023 B1 * | 2/2003 | Chang | 355/18 |
| 6,556,276 B2 | 4/2003 | Staeheli et al. | |
| 7,004,393 B2 | 2/2006 | Schum et al. | |
| 7,068,856 B2 | 6/2006 | Albertelli et al. | |
| 7,310,172 B2 * | 12/2007 | Dowdy et al. | 358/487 |
| 7,570,399 B2 * | 8/2009 | Abundis et al. | 358/497 |
| 7,626,739 B2 * | 12/2009 | Tregoning | 358/506 |
| 2003/0020970 A1 * | 1/2003 | Haas et al. | 358/506 |
| 2005/0094224 A1 * | 5/2005 | Shilling | 358/487 |

* cited by examiner

*Primary Examiner* — Kaitlin Joerger
*Assistant Examiner* — Patrick Cicchino

(57) ABSTRACT

Systems and methods systems and methods for orienting media for improved scan quality are disclosed. In an exemplary implementation, a method may include receiving a transparency media in a media holder, and guiding the transparency media into the media holder. The method may also include accepting the transparency media in the media holder only if the transparency media is oriented with an emulsion side facing toward an imaging surface. The method may also include self-ejecting the transparency media from the media holder if the transparency media is oriented with the emulsion side facing away from the imaging surface.

20 Claims, 4 Drawing Sheets

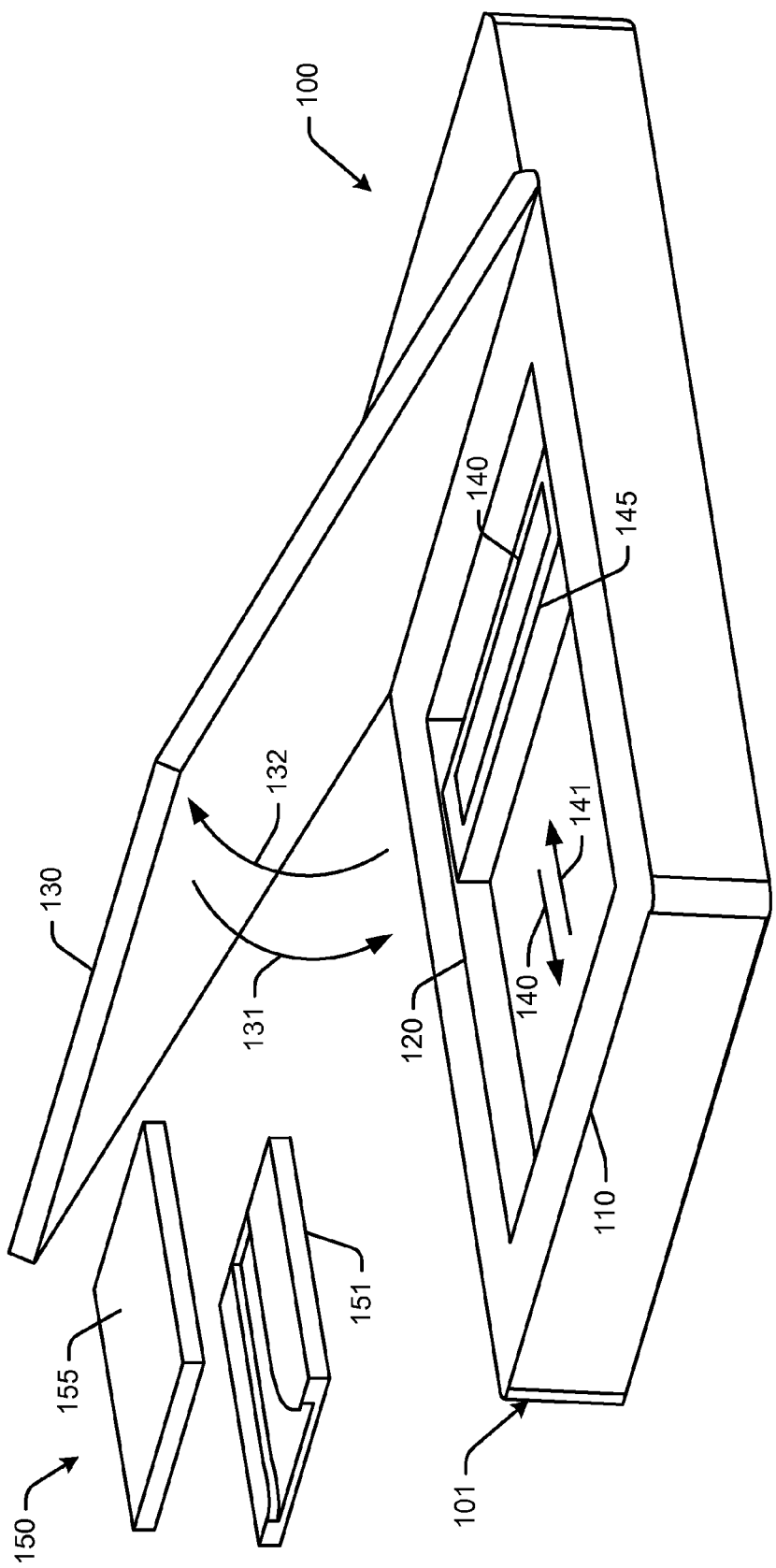

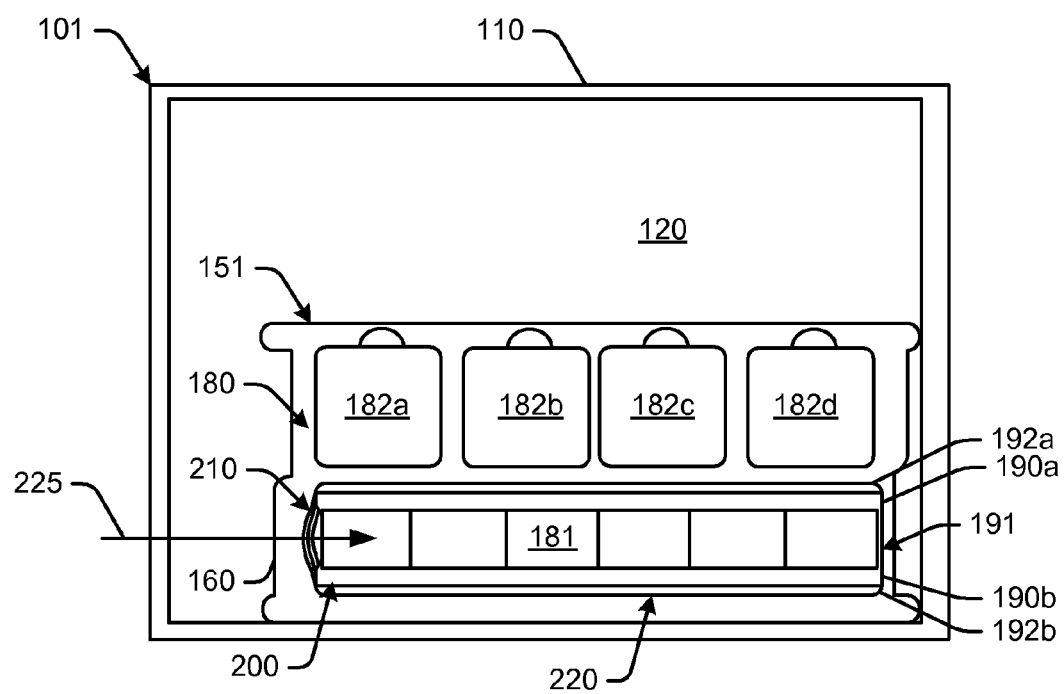

SYSTEMS AND METHODS FOR ORIENTING MEDIA FOR IMPROVED SCAN QUALITY

CROSS REFERENCE TO RELATED APPLICATIONS

This Application claims the benefit of provisional patent application serial number 61/054,017, filed May 16, 2008; entitled "Systems And Methods For Orienting Media For Improved Scan Quality" which application is incorporated by reference herein as if reproduced in full below.

BACKGROUND

Imaging devices, such as scanners, copiers, facsimile machines, and multipurpose machines, are commercially available for converting tangible images(e.g., documents, photographs) into electronic images. These imaging devices operate by generating light from a light source in the imaging device and reflecting this light off of the surface of the tangible image. The reflected light is collected on an array of photosensitive elements (e.g., a charge coupled device (CCD)), which convert the reflected light into electronic signals representing the image.

Imaging devices, such as the type described above, may be provided with media adaptors for use with different types of media. For example, back lighting (e.g., cathode fluorescent light bulbs) may be provided to back light transparent (or semi-transparent) images, such as overhead transparencies, film slides, and film negatives (generally referred to as media).

A media tray may be used to fix the media in a desired position to provide consistent results during the scanning operation. In the case of film negatives the resulting quality of the scan is dependent on how the user orients the film negative in the media tray. For best results, in terms of focus and color accuracy, the film negative should be located with the emulsion side towards the scanner bed. For example, placing the emulsion side of the film negative towards the backlight may result in a "mirrored" (or opposite) image as it appears relative to the scene captured on the film.

The user can identify the emulsion side because the film negative bows or curls toward the emulsion side. Although this is typically explained to the user in the product documentation, users may lose the product documentation, or not take the time to read and understand the documentation. Accordingly, the user may become frustrated when the scan result does not meet their expectations and the user has to reorient and rescan the film negative.

Software may be provided to detect orientation of the film negative and correct mirrored images by reversing the pixels. However, image quality still suffers even if the mirrored effect is compensated.

BRIEF DESCRIPTION OF THE DRAWINGS

FIG. 1 is a perspective view of an exemplary transparency imaging system which may implement the systems and methods for orienting media for improved scan quality.

FIG. 2 is a top plan view of an exemplary media holder shown on an imaging surface.

FIG. 3b is a cross-sectional view of the insertion zone taken along lines 3-3 in FIG. 3a.

DETAILED DESCRIPTION

Figure 3A:
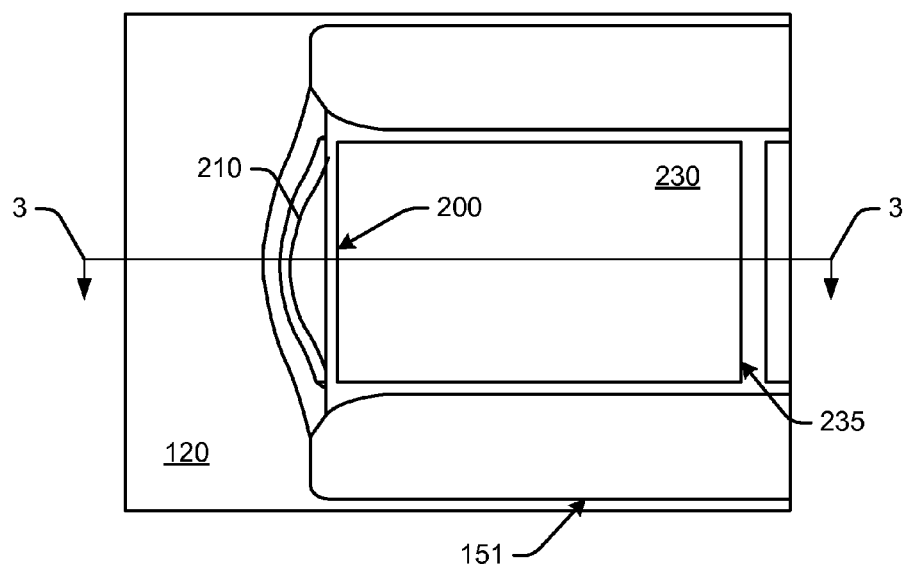
FIG. 3a is a partial view of the exemplary media holder shown in FIG. 2 enlarged to show an insertion zone.

Systems and methods for orienting media for improved scan quality are disclosed. The systems and methods may be implemented to automatically reinforce what is messaged on the product documentation (i.e., that the film negative should be inserted with the emulsion side down). Exemplary embodiments influence the orientation of film negative (or media) whereby a media holder effectively "ejects" media inserted in the incorrect orientation while retaining media inserted in the correct orientation. The media holder takes advantage of a physical property of film negatives (i.e., curling of the film negative towards the emulsion side), and rejects film negatives that are incorrectly oriented without the need for sensing equipment or software.

FIG. 1 is a perspective view of an exemplary transparency imaging system 100 which may implement the systems and methods for orienting media for improved scan quality. An exemplary transparency imaging system 100 may comprise an imaging device 101, such as a flatbed scanner. Although the systems and methods are described herein with reference to a flatbed scanner for purposes of illustration, it is understood that the systems and methods are not limited to use with flat bed scanners. For example, imaging device 101 may comprise handheld scanners, copiers, facsimile machines, multipurpose machines, digital imagine machines, and other electronic devices for capturing digital images.

In an exemplary embodiment, imaging device 101 comprises a housing 110 having an imaging surface 120 (e.g., glass platen). A cover 130 may also be provided to open and close over the imaging surface 120 (e.g., in the directions illustrated by arrows 131 and 132). The cover 130 is shown in an open position in FIG. 1.

Imaging device 101 may also comprise a light source 140 mounted on a carriage 145 within the housing 110 beneath the imaging surface 120. Carriage 145 is operable to move the light source 140 (e.g., in the directions illustrated by arrows 141 and 142) to illuminate object(s) placed adjacent the imaging surface 120.

It will be readily appreciated that imaging device 101, such as the flatbed scanner shown in FIG. 1 and described above, may also be provided with various ancillary devices. For example, imaging devices are often equipped with automatic document feeders, paper trays, I/O ports, output trays, LCD displays, and/or keypads to name only a few ancillary devices. These and other ancillary devices are commonly associated with imaging devices, and therefore are not shown or described herein as their description is not needed to fully understand or practice the invention.

The foregoing description of imaging device 101, and the flatbed scanner in particular, is provided as an illustration of one embodiment of an environment in which the systems and methods may be implemented. It should be understood, however, that the systems and methods may be used in conjunction with any of a wide range of other types and configurations of imaging devices that are now known or that may be developed in the future.

Transparency imaging system 100 may be provided with a media adapter 150 for imaging transparent or semi-transparent media (generally referred to herein as media), such as film negatives, overhead transparencies, or 35 mm slides, to name only a few types of media. Media adapter 150 is configured to receive the media for the imaging operation in a tray or media holder 151, as will be described in more detail below with reference to FIGS. 2-4.

Media adapter 150 may also include a light source provided internally in housing 155 for backlighting media received in the media adapter 150. For example, the light source may be a fluorescent or other white light source, or an LED light source where individual colored LED's are individually strobed to achieve the RGB color exposure. Media adapter 150 may also house a diffuser (e.g., frosted glass, not shown) provided between the light source and media. Diffusers for use with media adapters generally function to diffuse light emanating from the light source and distribute the light evenly over media received in the media adapter 150.

Media adapter 150 may also include a window (e.g., an opening) arranged between the light source and media received in the media adapter 150 so that light is projected onto the media. Optionally, the window may be covered with a transparent material (e.g., glass or clear plastic).

To operate the media adapter 150, a user may open or remove the cover 130 from the imaging device 101 and position the media adapter 150 on the imaging surface 120. In an exemplary embodiment, this involves positioning the media holder 151 directly adjacent the imaging surface 120, inserting the transparency media into the media holder 151, and placing or lowering the housing 155 including the backlight source over the media holder 151. The housing 155 can be a separate piece or integrated into the cover 130. The media adapter 150 may also be connected to a power source.

In operation, light originating at the light source in media adapter 150 is projected through the diffuser and the window and onto the transparency media to backlight the image on the transparency media. The backlit image is projected onto the imaging surface 120 of the imaging device 101. Light projected from the backlit image passes through the imaging surface 120 and onto photosensitive elements (e.g., provided on the carriage 145). These photosensitive elements are the same as those which already exist on conventional carriages 145 for receiving light reflected off of an opaque object being imaged on the imaging surface 120. An arrangement of optional lenses and mirrors may be provided to focus the light onto the photosensitive elements.

Operation of media adapters in general is understood and therefore further description is not necessary for a full understanding of, or to practice the systems and methods disclosed herein.

FIG. 2 is a top plan view of an exemplary media holder 151 shown on an imaging surface 120. Exemplary media holder 151 may comprise a housing 160 with one or more media slots 180 formed therein. In the exemplary embodiment shown in FIG. 2, the media holder 151 is configured with a media slot 181 for scanning a strip of film negatives and media slots 182a-d for scanning one or more slides. This specific configuration, however, is only exemplary and not intended to be limiting of the systems and methods described herein. Other configurations are also contemplated and may depend on various design considerations. For example, the media slots 182a-d may be provided in a separate media holder (not shown) in some embodiments.

In any event, the media slot 181 for scanning film negatives in the media holder 151 may be configured to automatically orient the media with the emulsion side facing the imaging surface 120. In an exemplary embodiment, media slot 181 may comprise lower shelf portions 190a-b and upper guide rails 192a-b on either side of an opening 191 (see also FIG. 3b). In this manner, media may be inserted so that the edges of the media slide between the shelf portions 190a-b and the upper guide rails 192a-b and the media is supported over the opening 191 in the media holder 151.

The media slot 181 may also include an insertion zone 200 for receiving the transparency media. A ramp 210 may be provided in the insertion zone 200 to align and guide the media into the media slot 181, as will be described in more detail below.

The media holder 151 incorporates several features to deliver quality scan results. Each side of the media holder 151 is located relative to the scan origin of the product, thereby consistently locating media under the backlight. A calibration region 220 is located on the right hand side of the media holder 151 to enable the imaging device 101 to adjust illumination levels and exposure for representative color accuracy. The media may be loaded from the left hand side (e.g., in the direction of arrows 225) through features which guide the user in orienting the media with the emulsion side facing the imaging surface 120, as explained in more detail below with reference to FIGS. 3 and 4.

Figure 3B:
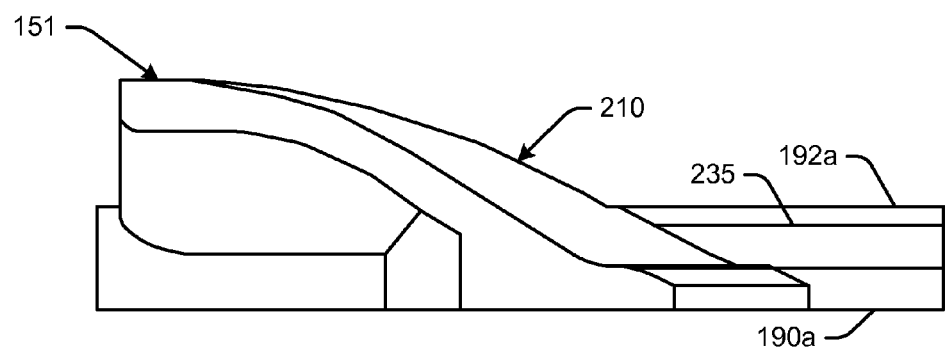

FIG. 3a is a partial view of the exemplary media holder 151 shown in FIG. 2 enlarged to show the insertion zone 200. In FIG. 3, a first frame 230 of the transparency media 235 is shown as it may be inserted in the media holder 151. FIG. 3b is a cross-sectional view of the insertion zone 200 taken along lines 3-3 in FIG. 3a.

Figure 4A:
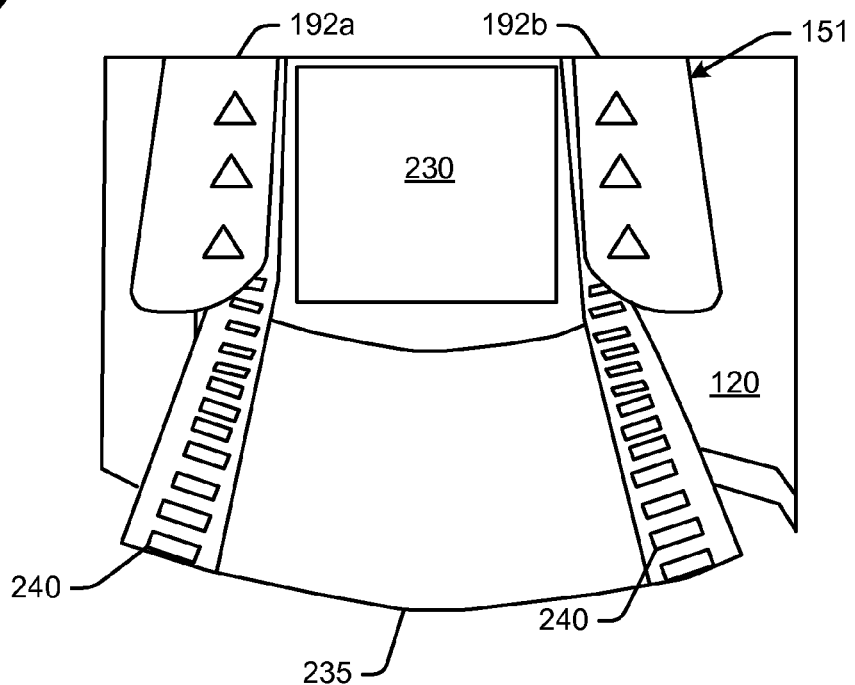
FIGS. 4a-b are illustrations of the insertion zone from FIG. 3a showing (a) proper insertion of a film negative, and (b) improper insertion of a film negative.
Figure 4B:
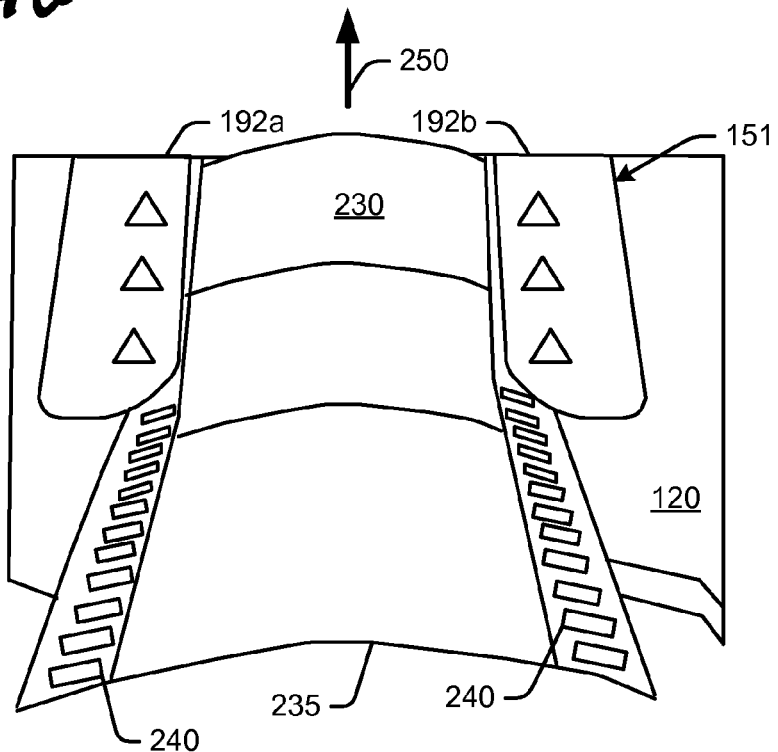

In FIGS. 3a and 3b, the ramp 210 can be seen leading underneath the guide rails 192a-b. The ramp 210 is configured to only contact the edge portion of the transparency media 225 (e.g., the edge portion containing perforations 240 as shown in FIGS. 4a and 4b). The center portion of the ramp 210 beneath the image frame may be recessed to prevent contact between the media and the media holder 151, thereby reducing the potential for scratching or damaging the media 235.

FIG. 4 are illustrations of the negative insertion zone from FIG. 3a showing (a) proper insertion of a film negative, and (b) improper insertion of a film negative. In an exemplary embodiment, the ramp 210 is configured to cause the media 235 to buckle along its narrow dimension as the media 235 is inserted by the user into the media holder 151. If the media 235 is oriented correctly (i.e., curling towards the imaging surface 120 with the emulsion side facing downward), the media 235 can be successfully inserted into the media holder 151 so that the edges of the media 235 are held between the guide rails 192a-b with the image portion of the media 235 stretched over the opening 191, as illustrated in FIG. 4a.

However, if the media 235 is inserted incorrectly (i.e., curling away from the imaging surface 120 with the emulsion side facing upward) the curl direction prevents buckling of the media 235. In addition, the amount of curl increases, as illustrated in FIG. 4b, until the media 235 "self-ejects" as illustrated by arrow 250. That is, the edges of the media 235 are released from beneath the guide rails 192a-b and the media 235 "pops" out of the media holder 151.

Accordingly, media holder 151 facilitates insertion of media 235 in the correct orientation, with the curl (emulsion side) facing the imaging surface 120. It is difficult, if not impossible, to insert the media 235 incorrectly with the curl (emulsion side) facing away from the imaging surface 120 (upwards towards the backlight).

It is noted that the exemplary embodiments shown and described are provided for purposes of illustration and are not intended to be limiting. Still other embodiments are also contemplated for orienting media for improved scan quality.

The invention claimed is:

1. A method for orienting media for improved scan quality, comprising:

receiving a transparency media in a media holder;
guiding the transparency media into the media holder; and
retaining the transparency media in the media holder after insertion only if the transparency media is oriented, with an emulsion side facing, toward an imaging surface by causing opposite edges of the transparency media to expand into guide rails in the media holder.

2. The method of claim 1, further comprising self-ejecting the transparency media from the media holder after insertion if the transparency media is oriented with the emulsion side facing away from the imaging surface by causing the opposite edges of the transparency media to retract away from the guide rails in the media holder.

3. The method of claim 2, wherein self-ejecting the transparency media further includes releasing, the transparency media from guide rails in the media holder.

4. The method of claim 2, wherein self-ejecting the transparency media is due at least in part to a curling action of the transparency media.

5. The method of claim 1, further comprising retaining the transparency media in the media holder due at least in part to a curling action of the transparency media.

6. The method of claim 1, further comprising automatically guiding a user to properly orient the transparency media in the media holder before an imaging operation.

7. The method of claim 1 wherein transparency media buckles along a narrow dimension of the transparency media as the transparency media is received in the media holder if the transparency media is properly oriented.

8. The method of claim 1, wherein receiving the transparency media is at an insertion zone of the media holder.

9. The method of claim 1, further comprising holding a properly oriented transparency media over the imaging surface with guide rails for an imaging operation.

10. The method of claim 1, further comprising holding a properly oriented transparency media at least partially over a calibration zone.

11. A system comprising:
a media holder configured to receive a transparency media;
a plurality of guide rails in the media holder, the guide rails configured to guide the transparency media into the media holder; and
a ramp located in an insertion zone on the media holder, the ramp causing the transparency media to be retained in the media holder after insertion only if the transparency media is oriented with an emulsion side facing toward an imaging surface, wherein a shape of the ramp causes opposite edges of a properly inserted transparency media to expand into the guide rails in the media holder.

12. The system of claim 11, wherein the ramp causes the transparency media to be ejected from the media holder if the transparency media is oriented with the emulsion side facing away from the imaging surface, wherein the shape of the ramp causes the opposite edges of the transparency media of an improperly inserted transparency media to retract from the guide rails in the media holder, 13. The system of claim 12, wherein self-ejecting the transparency media further includes releasing the transparency media from guide rails in the media holder.

14. The system of claim 11, wherein the media holder automatically guides a user to properly orient the transparency media before an imaging operation.

15. The system of claim 11, wherein the media holder positions a properly oriented transparency media at least partially over a calibration zone.

16. The system of claim 11, wherein the transparency media is a film negative.

17. The system of claim 11, wherein a center portion of the ramp is recessed to reduce image contact with the media holder, thereby reducing scratching or damaging the transparency media.

18. A system for orienting media for improved scan quality, comprising:
means for receiving a transparency media in a media holder;
means for guiding the transparency media into the media holder; and
means for retaining the transparency media in the media holder only if the transparency media is oriented with an emulsion side facing toward an imaging surface by spreading edges of the transparency media into the means for guiding the transparency media.

19. The system of claim 18, further comprising means for self-ejecting the transparency media from the media holder if the transparency media is oriented with the emulsion side facing away from the imaging surface by retracting edges of the transparency media away from the means for guiding the transparency media.

20. The system of claim 18, further comprising means for automatically guiding a user to properly orient the transparency media in the media holder before an imaging operation.

* * * * *

UNITED STATES PATENT AND TRADEMARK OFFICE
CERTIFICATE OF CORRECTION

| | | |
|---|---|---|
| PATENT NO. | : 8,155,575 B2 | Page 1 of 1 |
| APPLICATION NO. | : 12/257564 | |
| DATED | : April 10, 2012 | |
| INVENTOR(S) | : Ryan M. Smith et al. | |

It is certified that error appears in the above-identified patent and that said Letters Patent is hereby corrected as shown below:

In column 5, line 4, in Claim 1, delete "oriented," and insert -- oriented --, therefor.

In column 5, line 5, in Claim 1, delete "facing," and insert -- facing --, therefor.

In column 5, line 15, in Claim 3, delete "releasing," and insert -- releasing --, therefor.

In column 6, line 10, in Claim 12, delete "holder," and insert -- holder. --, therefor.

Signed and Sealed this
Sixth Day of November, 2012

David J. Kappos
*Director of the United States Patent and Trademark Office*